US005177139A

United States Patent [19]

Klaar et al.

[11] Patent Number: 5,177,139
[45] Date of Patent: Jan. 5, 1993

[54] MOULDING MATERIAL MADE FROM ELASTOMERIC POLYOLEFIN RUBBERS, POLYETHYLENES AND/OR ETHYLENE COPOLYMERS AND ADDITIVES; AND ITS USE FOR ELASTIC CLAMP-PROOF COURSES

[75] Inventors: Karlo Klaar, Troisdorf-Sieglar; Paul Spielau, Troisdorf-Eschmar, both of Fed. Rep. of Germany

[73] Assignee: Huels Troisdorf Aktiengesellschaft, Troisdorf, Fed. Rep. of Germany

[21] Appl. No.: 654,612

[22] PCT Filed: Aug. 11, 1989

[86] PCT No.: PCT/EP89/00946
§ 371 Date: Feb. 19, 1991
§ 102(e) Date: Feb. 19, 1991

[87] PCT Pub. No.: WO90/02154
PCT Pub. Date: Mar. 8, 1990

[30] Foreign Application Priority Data
Aug. 17, 1988 [DE] Fed. Rep. of Germany ....... 3827904

[51] Int. Cl.⁵ .............................................. C08K 5/01
[52] U.S. Cl. .................................. 524/484; 524/474; 524/481; 524/515; 524/525
[58] Field of Search ............... 524/474, 481, 515, 525

[56] References Cited

U.S. PATENT DOCUMENTS

| 4,113,804 | 9/1978 | Cotten et al. | 524/528 |
| 4,212,787 | 7/1980 | Matsuda et al. | 524/528 |
| 4,774,277 | 9/1988 | Janac et al. | 524/528 |
| 4,785,045 | 11/1988 | Yonekura et al. | 524/528 |
| 4,912,148 | 3/1990 | Kim et al. | 524/526 |
| 4,933,389 | 6/1990 | Hikassa et al. | 524/523 |

FOREIGN PATENT DOCUMENTS

| 2076302 | 10/1971 | France . |
| 1312901 | 4/1973 | United Kingdom . |
| 1595603 | 8/1981 | United Kingdom . |
| 2175592 | 12/1986 | United Kingdom . |

Primary Examiner—Paul R. Michl
Assistant Examiner—Edward Cain
Attorney, Agent, or Firm—Millen, White & Zelano

[57] ABSTRACT

A description is given of a molding compound made of elastomeric polyolefin rubbers, polyethylene and/or ethylene copolymers and additives, said compound comprising per 100 parts of polyolefin rubber, 25 to 100 parts by weight of polyethylene and/or ethylene copolymers having a MFI (190/2,16) of less than 0.1 [g/10 min], and between 16 and 28 parts by weight of a mineral oil. Also described is an elastic sealing strip, more particularly a roof sealing strip, made from the said molding compound by calendering or extruding.

15 Claims, 1 Drawing Sheet

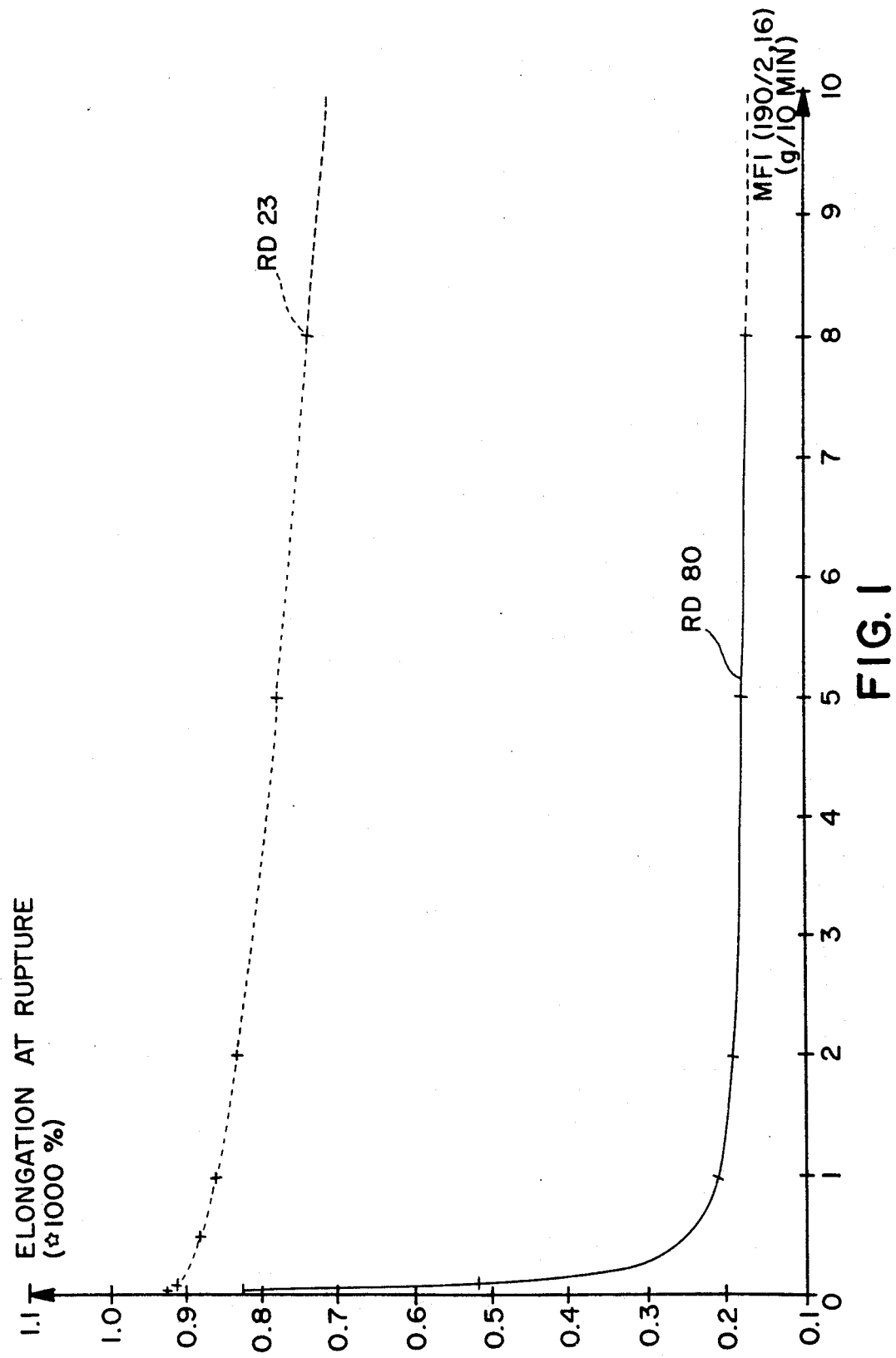

MOULDING MATERIAL MADE FROM ELASTOMERIC POLYOLEFIN RUBBERS, POLYETHYLENES AND/OR ETHYLENE COPOLYMERS AND ADDITIVES; AND ITS USE FOR ELASTIC CLAMP-PROOF COURSES

Molding compound made of elastomeric polyolefin rubbers, polyethylene and/or ethylene copolymers and additives as well as its use for elastic sealing strips.

BACKGROUND OF THE INVENTION

The invention relates to a molding compound according to the generic part of claim 1 and its use for elastic clamp-proof courses as well as to its use for elastic sealing strips.

Strip and foil material for providing seals in building construction, underground structures and engineering work must possess a series of different properties to ensure that structures remain watertight and weatherproof. These properties include high mechanical strength and adequate elongation both at room temperatures and at temperatures of up to about 80° C., long-term stability, the ability to join large areas to each other, resistance to aging and biological resistance. Sealing strips varying widely in composition, based upon thermoplastic synthetic materials, vulcanizable or vulcanized elastomers, and thermoplastic synthetic materials having elastomeric properties are already known, but although they have advantageous properties, they also have disadvantages (see for example: DE-AS 15 70 352, DE-AS 15 95 442, DE-OS 22 19 147, DE-24 10 572-A1, DE-24 15 850-A1, DE-25 10 162-A1, DE-26 21 825-B2, DE-26 28 741-A1 and DE-26 57 272-A1).

Although known thermoplastic sealing strips, based for example upon plasticized polyvinylchloride, polyisobutylene, acrylic polymers, or thermoplastics modified with bitumen may be simply and effectively welded to seams, they are sensitive to the effects of temperatures. Attempts are made to counteract these disadvantages by coating or incorporating fabrics or fleeces made of textile or glass fibers, but this has been only partly successful.

Although known sealing strips made of vulcanizable synthetic materials, e.g. based upon chloroprene rubber, ethylene propylene diene terpolymers, chlorosulfonated polyethylene rubber, or butyl rubber meet mechanical strength requirements at room temperature and are weatherproof, they have considerable disadvantage, however. Unvulcanized foils (e.g. EP-OS 0 082 490) do not meet mechanical demands at elevated temperatures and vulcanized sealing strips cannot be welded together, but can be permanently joined together only with difficulty by means of adhesive, adhesive tape or the like (see for example DE-OS 25 10 162).

There has recently been a change from the plastic sealing strips described hereinbefore, made of a single layer of one material, possibly with a reinforcing insert, to multilayer sealing strips made of vulcanizable materials. The outer layers are either unvulcanized or are vulcanized only to the extent that they can be welded by heat, by a solvent, or by a solvent welding agent, and at least one vulcanized layer is provided, see for example AT-PS 290 612 and DE-OS 26 28 741. The disadvantage, however, is that the process is dependent upon the type and amount of vulcanizing accelerator used and the time required for complete vulcanization.

DE-OS 22 19 147 discloses a sealing strip based upon EPDM. In addition to EDPM it contains polyethylene, polyisobutylene and fillers. At room temperature the elongation at rupture amounts to between 500 and 600%. At elevated temperatures such foils exhibit very low tensile strength and elongation at rupture.

DE-OS 24 10 572 discloses a sealing strip based upon polystyrene polybutadiene block copolymers having a greater elongation at rupture of max. 210% at 80° C. Such foils have unsatisfactory resistance to light and ozone.

Also known from DE-OS 26 21 825 is a sealing foil based upon polystyrene polybutadiene block copolymers with additions of chlorosulfonated polyethylene with very high elongation at rupture up to 660% at 80° C. However, when fillers are added, this value drops to less than 300%. It may also be gathered from this reference that the addition of polyethylene instead of chlorsulfonated PE produces poor elongation at rupture at 80° C.

DE-OS 26 57 272 discloses a thermoplastic compound for sealing foils. For the purpose of achieving satisfactory strength at elevated temperatures, this compound contains, in addition to 100 parts by weight of EPDM, between 50 and 150 parts by weight of a polyethylene having a melt flow index - MFI- (190/2.16) of between 0.2 and 50 g/10 min, and between 30 and 150 parts of carbon black and possibly bitumen, mineral oil, chalk and lubricants. These foils exhibit tensile strengths of up to 4.7 N/mm$^2$ and elongations at rupture of up to 420% at 70° C.

These mechanical values are inadequate for many practical applications. For instance, strips according to DE-OS 26 57 272 achieve elongations at rupture in excess of 300% only if they contain large amounts of polyethylene.

Sealing strips made of molding compounds containing large amounts of PE are so stiff that they cannot be used for roof sealing.

SUMMARY OF THE INVENTION

It is an object of the present invention to make available a molding compound suitable for producing extruded or calendered strips with improved elongation at rupture at 80° C. The said strips are to have satisfactory tensile strength at 80° C., an elongation of rupture in excess of 600% at 80° C., and as little stiffness as possible.

DETAILED DESCRIPTION OF THE PREFERRED EMBODIMENTS

The invention accomplishes this purpose by means of a molding compound comprising:
  per 100 parts by weight of polyolefin rubber
  25 to 150 parts by weight of polyethylene and/or ethylene copolymers having a MFI (190/2.16) of less than 0.1 g/10 min according to DIN 53 735 and
  16 to 28 parts by weight of a mineral oil.

The molding compound may contain additional components, more particularly inorganic fillers, carbon blacks lubricants and/or stabilizers.

In this connection, it is essential to the invention to use, on the one hand, a special polyethylene having a very low MFI (190/2.16) of less than 0.1 g/10 min, more particularly a MFI (190/5) of less than 0.1 g/10 min, and preferably a MFI (190/21.6) of less than 5 g/10 min according to DIN 53 735 and, on the other hand, between 16 and 28 parts by weight of a mineral oil per 100 parts by weight of polyolefin rubber.

It was found, surprisingly enough that the PE types selected according to the invention develop their advantageous properties—improved elongation at rupture at 80° C.—to an adequate degree, only in the presence of specific amounts of a mineral oil.

It is preferable to use between 25 and 50 parts by weight of polyethylene per 100 parts by weight of polyolefin rubber. With less than 25 parts by weight of polyethylene per 100 parts by weight of polyolefin rubber, tensile strength and elongation at rupture at 80° C. are too low, whereas with more than 50 parts by weight of polyethylene per 100 parts by weight of polyolefin rubber, the resulting strip is too stiff for many applications, e.g. roof sealing.

Regardless of this, however, it is possible to add to the amount of polyethylene according to the invention further amounts of polyethylene having higher MFI melt flow indices, without impairing the favorable elongation at rupture at 80° C.

The use of elastomeric vulcanizable, but unvulcanized, polyolefin rubbers imparts to the sealing strip according to the invention advantageous properties such as heat-weldability and resistance to weathering and aging. Because of their great strength and elongation at rupture, they require no reinforcing layers. Since no vulcanizing accelerators are used, there are also no storage problems, such as undesirable slow curing. Furthermore, any necessary repairs to a mechanically damaged location can be effected by welding on a fresh strip with hot gas.

In order to obtain roof sealing strip having a predominantly resilient feel, i.e. little stiffness, the compound should preferably contain between 25 and 50 parts by weight of the selected type of polyethylene per 100 parts by weight of polyolefin rubber. If increased stiffness causes no problem during processing, e.g. in the case of garbage dumps or tank installations, the compound may contain larger amounts of polyethylene, since this still provides very high tensile strength and elongation at rupture at 80° C.

In order to obtain a sealing strip with high mechanical properties, especially resistance to cold, resistance to performation even at high temperatures, low shrinkage, high tensile strength, elongation and dimensional stability, the elastomeric synthetic materials used are partly crystalline ethylene propylene terpolymers or partly crystalline ethylene propylene copolymers, or mixtures thereof.

Within the meaning of the present invention, polyolefin rubbers, upon which the thermoplastic compounds according to the invention are based, are preferably to be understood to mean polymers which can be made from ethylene, one or more α-olefins having 3 to 8 C-atoms, preferably propylene, and possibly one or more multiple olefins, with the aid of so-called Ziegler-Natta catalysts which may also contain activators and modifiers, in solution or dispersion, at temperatures of between −30° and +100° C., e.g. by the method according to DE-AS 15 70 352, DE-AS 15 95 442, DE-AS 17 20 450 or DE-OS 24 27 343.

These include saturated polyolefin rubbers which consist of 15 to 90% by weight, preferably 30 to 75% by weight of ethylene and of 85 to 10% by weight, preferably 70 to 25% by weight of propylene and/or butene-(1), and unsaturated polyolefin rubbers which, in addition to ethylene and propylene or butene-(1), consist of a multiple olefin, the amount thereof being such that the rubbers contain between 0.5 and 30 double bonds/1.000 C-atoms. Especially preferred multiple olefins are cis- and trans-hexadiene-(1.4), dicyclopentadiene, 5-methylene, 5-ethylidiene and 5-isopropylene-2-norbornenes.

It is preferable to use an EPM having an ethylene content in excess of 65% by weight and a propylene content less than 35% by weight or an EPDM having an ethylene content in excess of 65% by weight and a propylene content less than 30% by weight, and a maximum of 8% by weight of diene components, preferably less than 5%. The diene components may be ethylidenenorbornenes, for example. The degree of partial crystallinity of the EPDM-and/or EPM-types used is determined according to the DSC method in the differential-scan calorimeter measured melt curve. The maximum of the melt peak, measured as the temperature TS in ° C. according to the DSC curve, is known as the endothermal peak which may be very narrow or may also include a larger area. In the case of ethylene propylene terpolymers, the temperature TS is in the vincinity of 50° C. The amount of heat required for melting, known as $H_{50}$, also measured according to the DSC heat, provides information as to the presence of crystalline blocks in the ethylene propylene terpolymer or the ethylene propylene copolymer. Such partly crystalline EPDM or EPM types, having a melting heat of at least 10 J/g, are preferred according to the invention.

In choosing suitable elastomeric synthetic materials, especially of the EPDM- and EPM-types, the strength thereof is of importance. According to the invention, they should have a tensile strength, measured according to DIN 53 455, of at least 5 N/mm².

Suitable polyolefins, to be added to the compounds according to the invention, are, in the first place, crystalline and partly crystalline modifications of polyethylene having densities of 0.905 to 0.975 g/cm³ and melt flow indices (190/2.16) of less than 0.1 g/10 min. However, it is also possible to use partly crystalline copolymers of ethylene with other α-olefins within the limits of this specification, which contain 0.5 to 30% by weight of comonomers such as between 0.5 and 20% by weight of $C_{3-8}$ olefins.

Suitable mineral oils are those having kinetic viscosities of between $50 \times 10^{-6}$ m²/s (50 cSt) and $5 \times 10^{-3}$ m²/s 5000 cSt) at 20° C., preferably $200 \times 10^{-6}$ m²/s) (200 cSt) to $3 \times 10^{-3}$ [m²/s](3,000 cSt) at 20° C. and a density of 0.84 to 0.98 g/cm³. The oils may contain paraffinic, naphthenic or aromatic bound carbon atoms.

Suitable molding compounds according to the invention comprise per 100 parts by weight of polyolefin rubber, between 20 and 80 parts by weight of an inorganic filler, between 10 and 50 parts by weight of carbon black, and between 0.5 and 5 parts by weight of lubricants and stabilizers.

The choice of suitable fillers is of critical importance for plastic layers and additives which cooperate synergistically and improve the properties of the sealing strip, especially the mechanical properties. An essential component in this connection are semi-active or active carbon blacks, so-called reinforcing carbon black, the layers containing between 10 and 50 parts by weight, preferably between 20 and 45 parts by weight of carbon black per 100 parts by weight of polyolefin rubber. It is possible to use carbon blacks made by the furnace method which have an average particle size of between 30 and 60 μm and a BET surface of between 30 and 60 m²/g.

As a reinforcing filler and, at the same time, in order to cheapen the product, it is preferable to use silica, e.g. a mixture of silicic acid anhydride and kaolinite, the grain sized being less than 20 μm and the grain size of at least 40% of the mixture being less than 2 μm. However, it is also possible to replace up to 2/3 of the silica portion with other equally finely granular fillers such as chalk, kaolin, talcum, baryte, glassfibers or mixtures thereof.

The layers of sealing strip also contain stabilizers and anti-aging agents, based more particularly upon sterically hindered phenolic antioxidants, phenolic phosphites, thioesters of aliphathic carboxylic acids and the like. The following may be used as processing lubricants: metal soaps, for example calcium soaps, calcium stearate, zinc stearate. Montanic acid esters and/or hydrogenated hydrocarbons may be used as aids to processing.

The properties of the sealing strip according to the invention are adapted to the demands of the construction industry. In addition to being serviceable at room temperature, it is also serviceable at temperatures down to $-60°$ C. and up to about $+80°$ C. It is also weatherproof and biologically resistant. In addition to this, the strip is easy to process and watertight seams can be produced by hot air welding which is simple and in common use in construction work.

The molding compounds are mixed either continuously in a screw mixer or discontinuously in a closed kneading machine, e.g. a stamping kneader. With temperatures in the mixer between 130° and 200° C., the mixture is caused to melt. The compound leaves the mixer as a pasty, plasticized, still not fully homogenized mass which is then passed to a roughing mill for further mixing and processing at temperatures of between 170° and 185° C. The compound may then be passed to a strainer where it is finally homogenized and filtered. Upon leaving the strainer, the temperature of the compound is about 200° C. and may now be fed to an L- or F-type calender.

When fed to the roll gap of the calender, the temperature of the compound is between 185° and 190° C., while the temperature upon leaving the final calender roll is still 180° C. This procedure has the advantage of producing a homogeneous, bubble-free product and is specially adapted to the mixtures and molding compounds used to produce a sealing strip. It is possible to obtain take-off speeds, i.e. calender output speed, of between 10 and 20 m/min with the materials used and the foil thicknesses selected.

However, the mass prepared for calendering may also be converted into granules. It may then be extruded or injection molded to form sealing strips or parts.

The molding compounds of the present invention can be used to produce sealant strips having a tensile strength according to DIN 53455 greater than 0.8 [N/mm$^2$] and preferably greater than 1 [N/mm$^2$] at 80° C.

The molding compounds of the present invention can be used to produce elastic sealant strips and elongation at rupture according to DIN 53455 at 80° C. greater than 600% and tensile strength according to DIN 53455 greater than 0.7 [N/mm$^2$] at 80° C.

The following examples according to the invention and comparison examples, are intended to explain the present invention.

EXAMPLES 1 to 7

The following mixture is charged at 60° C. into a Werner & Pfleiderer stamping kneader and is kneaded at a mass temperature of 185° C.:

| | |
|---|---|
| 100.0 | parts by weight of ethylene propylene diene rubber (EPDM 1) |
| 30.0 | parts by weight of polyethylene |
| 22.0 | parts by weight of extender oil H 90 (mineral oil of mainly paraffinic base, ESSO AG) |
| 45.0 | parts by weight of Sillitin Z 82 (SiO$_2$ kaolin mixture, Messrs. Hoffmann & Söhne) |
| 38.0 | parts by weight of Corax N 550 FEF (semi-active reinforcing carbon black, Messrs. Degussa) |
| 1.8 | parts by weight of lubricants and stabilizers. |

The EPDM 1 used is a rubber consisting of 66% by weight of ethylene, 27% by weight of propylene and 7% by weight of ethylidene norbornenes with a polymer bulk strength of 12 N/mm$^2$ and a melting heat of 26 [J/g].

The MFI (190/2.16) of the polyethylene types used were varied between about 0.05 g/10 min. and 8 [g/10 min] as follows:

| EXAMPLE 1: | MFI (190/2.16) = 0.05 | g/10 min, |
|---|---|---|
| EXAMPLE 2: | MFI (190/2.16) = 0,1 | g/10 min, |
| EXAMPLE 3: | MFI (190/2.16) = 0,5 | g/10 min, |
| EXAMPLE 4: | MFI (190/2.16) = 1 | g/10 min, |
| EXAMPLE 5: | MFI (190/2.16) = 2 | g/10 min, |
| EXAMPLE 6: | MFI (190/2.16) = 5 | g/10 min, |
| EXAMPLE 7: | MFI (190/2.16) = 8 | g/10 min. |

In FIG. 1, the elongation at rupture at 23° C. (RD 23), and the elongation at rupture at 80° C. (RD 80), as measured according to DIN 53 455, are shown in relation to the MFI of examples 1 to 7. The figure shows that the elongation at rupture increases at 23° C. and slightly at a lower melting index, whereas the elongation at rupture at 80° C. assumes adequate values from a MFI of 0.1 g/10 min. This extreme dependency of the elongation at rupture at 80° C. upon the MFI was totally unexpected.

EXAMPLE 7 TO 10

The following mixture is charged, at 60° C., into a Werner & Pfleiderer type stamping kneader and is kneaded to a mass temperature of 185° C.:

| | |
|---|---|
| 100.0 | parts by weight of ethylene propylene diene rubber (EPDM 1) |
| 27.0 | parts by weight of polyethylene |
| 22.0 | parts by weight of extender oil H 90 |
| 45.0 | parts by weight of siliceous chalk Sillitin Z82 |
| 38.0 | parts by weight of carbon black Corax N 550 FEF |
| 1.8 | parts by weight of lubricants and stabilizers. |

The EPDM 1 used is a rubber consisting of 66% by weight of ethylene, 27% by weight of propylene and 7% by weight of ethylidene norbornenes with a polymer bulk strength of 12 N/mm$^2$ and a melting heat of 26 J/g.

The polyethylenes used in Examples 7 to 10 are described in Table 1 below by their MFI (190/2.16), their density and their polymerization type. In this Table:
LD: signifies low density polyethylene
LLD: signifies linear low density polyethylene
HD: signifies high density polyethylene.

The materials kneaded in the manner described hereinbefore are fed to a 190° C. roughing mill, then to a calender having a roll temperature of between 180° and 200° C. and are calendered into a 1 mm thick foil. Also shown in Table 1 are the following values for these foils: tensile strength at 23° C. (RF 23), tensile strength at 80° C. (RF 80), elongation at rupture at 23° C. (RD 23), and elongation at rupture at 80° C. (RD 80).

EXAMPLES 11 TO 14

Examples 11 to 14 are comparison examples taken from DE-OS 26 57 272 (examples 1,2,4 and 5). In contrast to Examples 7 to 10, tensile strength and elongation at rupture are measured, not at 80°, but at 70° C. The values in Table 1 are therefore shown in brackets. Compositions are also shown in Table 1.

EXAMPLES 15 TO 17

The amounts and qualities shown in Table 1 are prepared according to Example 7 and are made into foils by calendering. Strength and elongation values are shown in Table 1.

therefore impossible to draw conclusions from elongation values at 23° C. as to the behavior of the materials at elevated temperatures, for example at 80° C. It was all the more surprising that the improvements in properties shown could be achieved by the special polyethylene type according to the invention.

EXAMPLES 18 TO 32

The qualities and types listed in Table 2 below are as described in Example 7, but with an ethylene propylene diene rubber (EPDM 2) containing 67% by weight of ethylene, 30% by weight of propylene and 3% by weight of ethylidene norbornenes, with a polymer bulk strength of 13.5 N/mm$^2$ and a melting heat of 30 J/g, processed into foils and measured.

In the case of comparison examples 19,20,21,23 and 24, the MFI values of which for the polyethylene lie outside the invention, values for elongation at rupture at 80° C. were low. Higher values were obtained only in Example 22, in which the MFI value of the polyethylene used is within the limits of the invention, but without reaching the preferred range in excess of 600%.

TABLE 1

| Example | POLYETHYLENE Part by weight | MFI (190/2.16) | Type | OIL (Bit.) Parts by weight | Inorganic fillers Parts by weight | Carbon black Parts by weight | Tensile Strength RF 23 [N/mm$^2$] | RF 80 (70) [N/mm$^2$] | Elongation at rupture RD 23 [%] | RD 80 (70) [%] |
|---|---|---|---|---|---|---|---|---|---|---|
| 7 | 27 | <0.1 | HD | 22 | 45 | 38 | 14.6 | 0.80 | 760 | 812 |
| 8 | 27 | 8 | HD | 22 | 45 | 38 | 12.0 | 0.44 | 752 | 114 |
| 9 | 27 | 4 | LD | 22 | 45 | 38 | 11.4 | 0.47 | 742 | 112 |
| 10 | 27 | 5 | LLD | 22 | 45 | 38 | 11.6 | 0.33 | 756 | 194 |
| 11*1 | 50.6 | 8 | LD | — | — | 90 | 8.2 | (2.6) | 860 | (240) |
| 12*2 | 50.6 | 8 | LD | (33.4) | — | 145 | 5.8 | (2.6) | 400 | (220) |
| 13*3 | 100 | 0.7 | HD | (30) | 40 | 90 | 9.1 | (3.5) | 710 | (290) |
| 14*4 | 145 | 0.5 | HD | (30) | 40 | 90 | 10.9 | (4.4) | 760 | (420) |
| 15 | 0 | — | — | 20 | 70 | 50 | 7.0 | 0.04 | 750 | 350 |
| 16 | 0 | — | — | 19 | 70 | 40 | 9.0 | 0.23 | 520 | 120 |
| 17 | 50 | 4 | LD | 10 | 120 | 10 | 12.5 | 1.1 | 650 | 75 |

VALUES IN ( ) = BITUMEN
VALUES IN ( ) = TEST VALUES AT 70° C.

*1 EXAMPLE 5 from DE-OS 26 57 272
*2 EXAMPLE 1 from DE-OS 26 57 272
*3 EXAMPLE 2 from DE-OS 26 57 272
*4 EXAMPLE 4 from DE-OS 26 57 272

As may be gathered from the examples in Table 1, the tensile strengths in comparison examples 8 to 17 at 23° C. have very high values in spite of differences in composition. At elevated temperatures of 80° and 70° C., however, elongation at rupture values decline drastically, down to Example 7 in which a PE having a very high molecular weight, i.e. a low MFI is used. It is Examples 29,31 and 32 show that satisfactory elongation at rupture at 80° C. cannot be obtained with too little mineral oil, nor by increasing the proportion of the polyethylene type according to the invention.

TABLE 2

| Example | POLYETHYLENE Part by weight | MFI (190/2.16) | Type | OIL Parts by weight | Inorganic Fillers Parts by weight | Carbon black Parts by weight | Tensile Strength RF 23 [N/mm$^2$] | RF 80 [N/mm$^2$] | Elongation at rupture RD 23 [%] | RD 80 [%] |
|---|---|---|---|---|---|---|---|---|---|---|
| 18 | 27 | <0.1 | HD | 22 | 45 | 38 | 14.0 | 0.70 | 820 | 1,330 |
| 19 | 27 | 0.45 | HD | 22 | 45 | 38 | 12.8 | 0.36 | 846 | 276 |
| 20 | 27 | 0.25 | LD | 22 | 45 | 38 | 10.7 | 0.50 | 790 | 124 |
| 21 | 27 | 3.3 | LLD | 22 | 45 | 38 | 13.2 | 0.13 | 870 | 298 |
| 22 | 27 | 0.1 | HD | 22 | 45 | 38 | 12.7 | 0.35 | 850 | 522 |
| 23 | 27 | 0.2 | LLD | 22 | 45 | 38 | 14.1 | 0.52 | 844 | 338 |
| 24 | 27 | 1.0 | LLD | 22 | 45 | 38 | 14.2 | 0.17 | 866 | 372 |
| 25 | 30 | <0.1 | HD | 16 | 45 | 0 | 19.9 | 1.1 | 1,150 | 610 |
| 26 | 45 | <0.1 | HD | 22 | 45 | 38 | 18.2 | 1.7 | 990 | 970 |
| 27 | 90 | <0.1 | HD | 22 | 45 | 38 | 19.5 | 2.5 | 970 | 1,100 |
| 28 | 150 | <0.1 | HD | 22 | 45 | 38 | 19.2 | 5.5 | 610 | 1,100 |
| 29 | 25 | <0.1 | HD | 5 | 45 | 38 | 19.0 | 1.4 | 900 | 400 |
| 30 | 27 | <0.1 | HD | 22 | 60 | 38 | 15.6 | 1.1 | 980 | 600 |
| 31 | 27 | <0.1 | HD | 10 | 45 | 10 | 21.8 | 1.0 | 1,070 | 470 |
| 32 | 50 | <0.1 | HD | 10 | 120 | 10 | 15.0 | 2.0 | 790 | 500 |

EXAMPLE 33

A mixture consisting of:

| | |
|---|---|
| 100.0 | parts by weight of ethylene propylene diene rubber (EPDM 2) |
| 25.0 | parts by weight of polyethylene MFI (190/5) less than 0.1 g/10 min |
| 25.0 | parts by weight of polyethylene MFI (190/2.16) of 1 g/10 min. |
| 22.0 | parts by weight of extender oil H 90 |
| 45.0 | parts by weight of siliceous chalk Sillitin Z82 |
| 38.0 | parts by weight of carbon black Corax N 550 FEF |
| 1.8 | parts by weight of lubricants and stabilizers | is prepared as described in Example 7 and is made into 1 mm foil by calendering. The measured properties were:

| | | | |
|---|---|---|---|
| RF 23° C.: | 19.5 N/mm$^2$ | RD 23° C.: | 1060% |
| RF 80° C.: | 1.2 N/mm$^2$ | RD 80° C.: | 800%. |

As shown by the measurements obtained, additional amounts of polyethylene with a higher MFI can be added to the amounts of polyethylene according to the invention without impairing the required high elongation at rupture at 80° C.

We claim:

1. A molding compound comprising:
   a) unvulcanized polyolefin rubber;
   b) 25 to 50 parts by weight per 100 parts by weight of (a), of polyethylene, an ethylene copolymer or a mixture thereof; each having having MFI (190/2.16) of less than 0.1 g/10 min according to DIN 53 735; and
   c) between 16 and 28 parts by weight of mineral oil per 100 parts by weight of (a).

2. A molding compound according to claim 1, further comprising:
   d) inorganic fillers;
   e) carbon blacks;
   f) lubricants and/or stabilizers; or
   g) polyethylene and/or ethylene copolymers with a MFI (190/2.16) greater than 0.1 g/10 min.

3. A molding compound according to claim 1, further comprising per 100 parts by weight of polyolefin rubber:
   d) between 20 and 80 parts by weight of an inorganic filler;
   e) between 10 and 50 parts by weight of carbon black; and
   f) between 0.5 and 5 parts by weight of lubricants and stabilizers.

4. A molding compound according to claim 1, wherein said polyethylene or ethylene copolymers under b) have a MFI (190/5) of less than 0.1 g/10 min and a MFI (190/21.6) of less than 5 g/10 min according to DIN 53735.

5. A molding compound according to claim 1, wherein the rubber used under a) is partly crystalline rubber and comprises at least a polymer bulk strength of 5 N/mm$^2$.

6. A molding compound according to claim 1, wherein the polyethylene or ethylene copolymers are used in amounts of between 25 and 50 parts by weight.

7. A molding compound according to claim 1, wherein the ethylene copolymers used contain between 0.5 and 20% by weight of $C_3$–$C_8$ olefins as comonomers.

8. A molding compound according to claim 1, wherein said compound contains, as fillers, between 40 and 60 parts by weight of inorganic fillers such as chalk, kaolin, talcum, baryte and/or glass fibers mixed with silica or silica only.

9. A molding compound according to claim 1, wherein reinforcing or semi-reinforcing carbon blacks are used in amounts of between 20 and 40 parts by weight per 100 parts by weight of polyolefin rubber.

10. An elastic sealing strip prepared from a holding compound comprising:
    a) unvulcanized polyolefin rubber;
    b) 25 to 50 parts by weight per 100 parts by weight of (a), of polyethylene, an ethylene copolymer or a mixture thereof; each having having MFI (190/2.16) of less than 0.1 g/10 min according to DIN 53 735; and
    c) between 16 and 28 parts by weight of mineral oil per 100 parts by weight of (a).

11. An elastic sealing strip according to claim 10 wherein the tensile strength of the sealing strip according to DIN 53 455 is greater than 0.8 N/mm2 at 80° C.

12. An elastic sealing strip according to claim 11, wherein the elongation at rupture according to DIN 53 455 at 80° C. is greater than 600% and the tensile strength according to DIN 53 455 is greater than 0.7 N/mm$^2$ a 80° C.

13. An elastic sealing strip according to claim 11, wherein the tensile strength of the sealing strip according to DIN 53 455 is greater than 1 N/mm2 at 80° C.

14. An elastic sealing strip according to claim 10, prepared by calendering or extrusion process.

15. A method of sealing two surfaces comprising and contacting both surfaces with an elastic sealing strip of claim 10.

* * * * *